(12) United States Patent
Liu (10) Patent No.: US 11,848,771 B2
(45) Date of Patent: Dec. 19, 2023

(54) ENCODING METHOD, DECODING METHOD, ENCODING DEVICE AND DECODING DEVICE

(71) Applicant: TCL CHINA STAR OPTOELECTRONICS TECHNOLOGY CO., LTD., Shenzhen (CN)

(72) Inventor: Jinfeng Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 106 days.

(21) Appl. No.: 17/423,327

(22) PCT Filed: May 27, 2021

(86) PCT No.: PCT/CN2021/096476
§ 371 (c)(1),
(2) Date: Jul. 15, 2021

(87) PCT Pub. No.: WO2022/170691
PCT Pub. Date: Aug. 18, 2022

(65) Prior Publication Data
US 2023/0155718 A1    May 18, 2023

(30) Foreign Application Priority Data
Feb. 10, 2021  (CN) .......................... 202110185117.1

(51) Int. Cl.
*H04W 72/04*    (2023.01)
*H04L 1/00*    (2006.01)

(52) U.S. Cl.
CPC ................................. *H04L 1/0008* (2013.01)

(58) Field of Classification Search
CPC ........ G06T 9/005; H03M 7/46; G06F 13/126; H04L 25/4904; H04L 7/04; H04L 1/0078;
(Continued)

(56) References Cited

U.S. PATENT DOCUMENTS

| 4,494,194 A | * | 1/1985 | Harris | .................... G06F 13/385 |
| | | | | 710/46 |
| 4,631,666 A | * | 12/1986 | Harris | .................... G06F 13/385 |
| | | | | 709/217 |

(Continued)

FOREIGN PATENT DOCUMENTS

| CN | 107682020 A | 2/2018 |
| CN | 109525372 A | 3/2019 |

(Continued)

*Primary Examiner* — Jung Liu
(74) *Attorney, Agent, or Firm* — The Roy Gross Law Firm, LLC; Roy Gross (57) ABSTRACT

An encoding method, a decoding method, an encoding device and a decoding device are provided. The encoding method includes: obtaining a first bit stream of an original encoded data; determining whether a number of the successive bits is greater than a predetermined number; if the number of the successive bits is greater than the predetermined number, then selecting at least one target bit from the successive bits; performing a logic NOT operation on the target bit to obtain a symbol bit; and inserting the symbol bit to the successive bits to obtain an encoded bit stream. The present disclosure could raise the encoding speed and reliability.

16 Claims, 5 Drawing Sheets

(58) Field of Classification Search
CPC ... H04L 1/0007; H04L 1/1887; H04L 1/1896; H04L 1/1893; H04L 1/0003; H04W 72/23; H04W 52/146; H04W 72/0446
See application file for complete search history.

(56) References Cited

U.S. PATENT DOCUMENTS

| | | | | |
|---|---|---|---|---|
| 5,311,508 | A | * | 5/1994 | Buda ..................... G06F 13/126 |
| | | | | 370/476 |
| 5,600,316 | A | * | 2/1997 | Moll ..................... G06T 9/005 |
| | | | | 341/87 |
| 8,107,542 | B1 | * | 1/2012 | Lou ..................... H03M 7/46 |
| | | | | 375/259 |
| 2017/0290008 | A1 | * | 10/2017 | Tooher ................. H04L 1/0078 |

FOREIGN PATENT DOCUMENTS

| | | |
|---|---|---|
| CN | 110086575 A | 8/2019 |
| CN | 110098837 A | 8/2019 |

\* cited by examiner

ENCODING METHOD, DECODING METHOD, ENCODING DEVICE AND DECODING DEVICE

This application a National Phase of PCT Patent Application No. PCT/CN2021/096476 having International filing date of May 27, 2021, which claims the benefit of priority of Chinese Patent Application No. 202110185117.1, entitled "ENCODING METHOD, DECODING METHOD, ENCODING DEVICE AND DECODING DEVICE", filed on Feb. 10, 2021. The contents of the above applications are all incorporated by reference as if fully set forth herein in their entirety.

FIELD OF THE DISCLOSURE

The present disclosure relates to a data transmission technology, and more particularly to an encoding method, a decoding method, an encoding device and a decoding device.

BACKGROUND

The digital signal encoding technology is used to transform the binary digital data (0/1) into a square wave having a specific polarity, amplitude, bit rate, and modulation. When the signal is transmitted in a serial transmission, the transmitted data could be encoded into a data stream comprising a clock portion such that the receiver could extract the clock synchronization information from the data stream. The clock synchronization information could ensure the receiver to obtain the original data from the received signal according to the right timing. However, if the successive 0s or 1s are too many in the signal transmission process, the phase shift or frequency deviation might easily occurs during data recovery process performed by the receiver. This kind of error is called "bit error."

Therefore, the data needs to be encoded for transmission to avoid too many successive 0s or 1s in the data stream.

However, in order to ensure the reliability and safety of data transmission, the conventional encoding method is generally complicated such that the data encoding speed is slow and thus the data transmission quality is lower. In addition, because the conventional encoding method is complicated, the cost of the encoding hardware cannot be reduced.

Therefore, an encoding method, a decoding method, an encoding device and a decoding device should be provided to solve the above issues.

SUMMARY

One objective of an embodiment of the present disclosure is to provide an encoding method, a decoding method, an encoding device and a decoding device to solve the above issues caused by the conventional complicated encoding method, low encoding speed, and high cost of conventional encoding hardware.

According to an embodiment of the present disclosure, an encoding method is disclosed. The encoding method comprises: obtaining a first bit stream of an original encoded data, wherein the first bit stream comprises successive bits having a same value; determining whether a number of successive bits is greater than a predetermined number; if the number of successive bits is greater than the predetermined number, then selecting at least one target bit from the successive bits; performing a logic NOT operation on the target bit to obtain a symbol bit; and inserting the symbol bit to the successive bits to obtain an encoded bit stream.

Optionally, the step of obtaining the at least one target bit from the successive bits comprises: obtaining a ratio of the number of the successive bits to the predetermined number and taking ceiling of the ratio to obtain a first integer; and selecting a plurality of target bits from the successive bits, wherein a number of the plurality of target bits is equal to the first integer. The step of performing the logic NOT operation on the target bit to obtain the symbol bit comprises: performing the logic NOT operation on the plurality of target bits to obtain a plurality of symbol bits. The step of inserting the symbol bit to the successive bits to obtain the encoded bit stream comprises: inserting the plurality of symbol bits into the successive bits to obtain the encoded bit stream.

Optionally, the step of selecting the at least one target bit from the successive bits comprises: obtaining a ratio of the number of successive bits to the predetermined number and chopping off of the ratio to obtain a second integer; and selecting a plurality of target bits from the successive bits, wherein a number of the plurality of target bits is equal to the second integer. The step of performing the logic NOT operation on the target bit to obtain the symbol bit comprises: performing the logic NOT operation on the plurality of target bits to obtain a plurality of symbol bits. The step of inserting the symbol bit to the successive bits to obtain the encoded bit stream comprises: inserting the plurality of symbol bits into the successive bits to obtain the encoded bit stream.

Optionally, a number of bits between two adjacent symbol bits of the plurality of symbol bits is smaller than or equal to the predetermined number and the number of bits between two adjacent symbol bits of the plurality of symbol bits is greater than or equal to 1.

Optionally, the first bit stream has 8 bits and the encoded bit stream has nine or ten bits.

Optionally, a number of bits between two adjacent symbol bits of the plurality of symbol bits is smaller than or equal to the predetermined number and the number of bits between two adjacent symbol bits of the plurality of symbol bits is greater than or equal to 1.

Optionally, the first bit stream has 8 bits and the encoded bit stream has nine or ten bits.

Optionally, the encoding method further comprises: determining whether the encoded bit stream is serial data or parallel data; and if the encoded bit stream is parallel data, then transforming the encoded bit stream from parallel data to serial data.

According to an embodiment of the present disclosure, a decoding method is disclosed. The decoding method comprises obtaining an encoded bit stream to be decoded; identifying a symbol bit from the encoded bit stream, and deleting the symbol bit to obtain a decoded bit stream.

Optionally, the decoding method further comprises following steps before identifying the symbol bit from the encoded bit stream: determining whether the encoded bit stream is serial data or parallel data; and if the encoded bit stream is parallel data, then transforming the encoded bit stream from parallel data to serial data.

According to an embodiment of the present disclosure, an encoding device is disclosed. The encoding device comprises: an encoding obtaining unit, configured to obtain a first bit stream of an original encoded data, wherein the first bit stream comprises successive bits having a same value; a determining unit, configured to determine whether a number of successive bits is greater than a predetermined number and select at least one target bit from the successive bits if the number of successive bits is greater than the predetermined number; a logic operation unit, configured to perform a logic NOT operation on the target bit to obtain a symbol bit; and an encoding unit, configured to insert the symbol bit to the successive bits to obtain an encoded bit stream.

Optionally, the obtaining the at least one target bit from the successive bits comprises obtaining a ratio of the number of the successive bits to the predetermined number and taking ceiling of the ratio to obtain a first integer, and selecting a plurality of target bits from the successive bits, where a number of the plurality of target bits is equal to the first integer. The step of performing the logic NOT operation on the target bit to obtain the symbol bit comprises performing the logic NOT operation on the plurality of target bits to obtain a plurality of symbol bits. The step of inserting the symbol bit to the successive bits to obtain the encoded bit stream comprises inserting the plurality of symbol bits into the successive bits to obtain the encoded bit stream.

Optionally, a number of bits between two adjacent symbol bits of the plurality of symbol bits is smaller than or equal to the predetermined number and the number of bits between two adjacent symbol bits of the plurality of symbol bits is greater than or equal to 1.

Optionally, the selecting the at least one target bit from the successive bits comprises obtaining a ratio of the number of successive bits to the predetermined number and chopping off of the ratio to obtain a second integer, and selecting a plurality of target bits from the successive bits, where a number of the plurality of target bits is equal to the second integer. The step of performing the logic NOT operation on the target bit to obtain the symbol bit comprises: performing the logic NOT operation on the plurality of target bits to obtain a plurality of symbol bits. The step of inserting the symbol bit to the successive bits to obtain the encoded bit stream comprises inserting the plurality of symbol bits into the successive bits to obtain the encoded bit stream.

Optionally, a number of bits between two adjacent symbol bits of the plurality of symbol bits is smaller than or equal to the predetermined number and the number of bits between two adjacent symbol bits of the plurality of symbol bits is greater than or equal to 1.

Optionally, the first bit stream has 8 bits and the encoded bit stream has nine or ten bits.

Optionally, the encoding device further comprises: determining whether the encoded bit stream is serial data or parallel data; and if the encoded bit stream is parallel data, then transforming the encoded bit stream from parallel data to serial data.

According to an embodiment of the present disclosure, a decoding device is disclosed. The decoding device comprises: an encoding obtaining unit, configured to obtain an encoded bit stream to be decoded; an identifying unit, configured to identify a symbol bit from the encoded bit stream; and a decoding unit, configured to delete the symbol bit to obtain a decoded bit stream.

According to an embodiment of the present disclosure, a computer includes one or more processors, a memory, and one or more application instructions, stored in the memory and executable by the one or more processors to perform the encoding method, or to perform the decoding method.

According to an embodiment of the present disclosure, a computer-readable storage medium stores instructions executable by one or more processors to perform the encoding method, or to perform the decoding method.

The present disclosure provides an encoding method, a decoding method, an encoding device and a decoding device. In the encoding process, the present disclosure could merely determine successive bits corresponding to the same value in the first bit stream and perform a simple logic NOT operation on at least one target bit according to the determination result to generate at least one symbol bit. Then, the symbol bit is inserted to the successive bits to get the encoded bit stream. This encoding method has a simple logic and reduces the encoding complexity. This could raise the encoding speed and reliability. In addition, because the encoding logic is simple, the hardware requirement is low and thus the cost is reduced.

BRIEF DESCRIPTION OF THE DRAWINGS

In order to explain the technical solutions in the embodiments of the present disclosure or the prior art more clearly, the drawings used in the description of the embodiments or the prior art are briefly introduced below. Obviously, the drawings in the following description are merely some embodiments of the present disclosure. For those of ordinary skill in the art, other drawings can be acquired according to the structure shown in the drawings without paying creative labor.

DETAILED DESCRIPTION

The technical solutions in the embodiments of the present disclosure will be clearly and completely described below with reference to the drawings in the embodiments of the present disclosure. Obviously, the described embodiments are only a part of the embodiments of the present disclosure, but not all of the embodiments. Based on the embodiments in the present disclosure, all other embodiments acquired by a person of ordinary skill in the art without creative efforts fall into the protection scope of the present disclosure.

In addition, descriptions related to "first", "second", etc. in this disclosure are for descriptive purposes only, and cannot be understood as indicating or implying their relative importance or implicitly indicating the number of technical features indicated. Therefore, the features defined as "first" and "second" may explicitly or implicitly include at least one of the features. In the description of the present disclosure, the meaning of "a plurality" is at least two, for example, two, three, etc., unless it is specifically and specifically defined otherwise.

In general, when the transmitter (TX) transfers data to the receiver (RX), there should be not only the data transmission/receiving mechanism but also the clock information transmission/receiving mechanism. In a high speed interface data transmission, in order to raise the data transmission quality, reduce the electromagnetic interference, provide an error detection mechanism, and simplify the clock circuit, the data to be transferred are encoded to meet these demands. As previously mentioned, the conventional signal encoding method is complicated.

Therefore, the present disclosure provides an encoding method, a decoding method, an encoding device and a decoding device and will illustrate in detail in the following disclosure.

According to a first aspect of the present disclosure, an encoding method is disclosed. The encoding method includes obtaining a first bit stream of an original encoded data, wherein the first bit stream comprises successive bits having a same value; determining whether a number of successive bits is greater than a predetermined number; if the number of successive bits is greater than the predetermined number, then selecting at least one target bit from the successive bits; performing a logic NOT operation on the target bit to obtain a symbol bit; and inserting the symbol bit to the successive bits to obtain an encoded bit stream.

Figure 1:
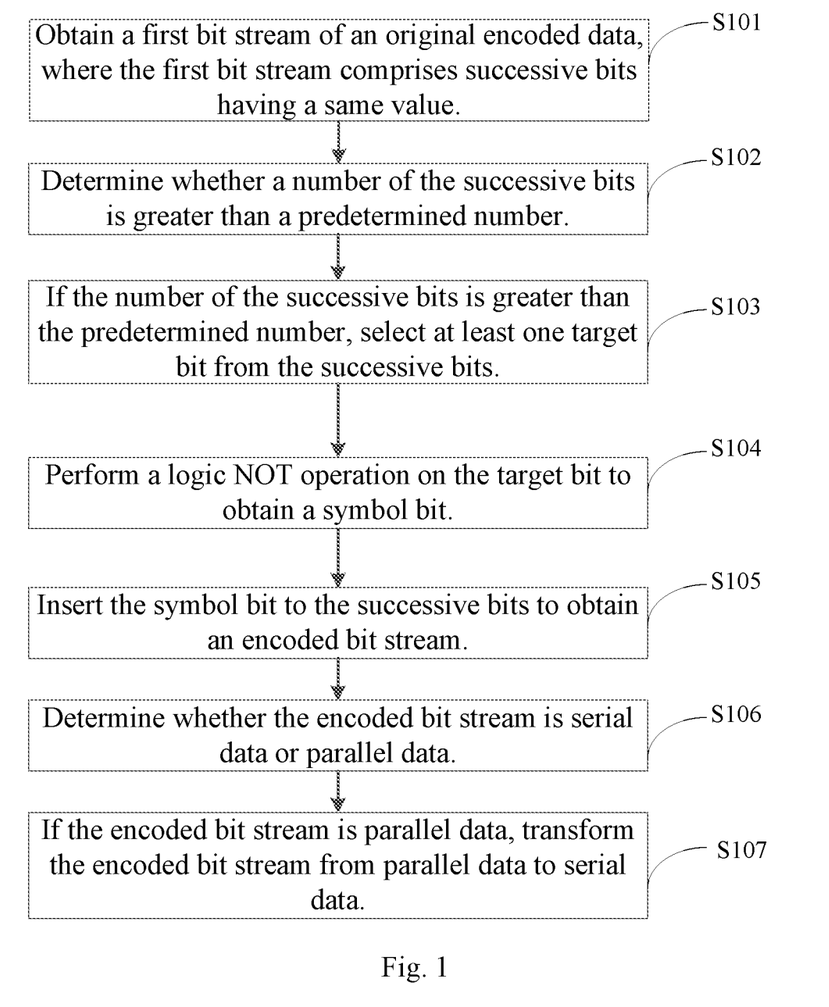
FIG. 1 is a flow chart of an encoding method according to an embodiment of the present disclosure.

Please refer to FIG. 1. FIG. 1 is a flow chart of an encoding method according to an embodiment of the present disclosure. As shown in FIG. 1, an encoding method according to an embodiment of the present disclosure is disclosed. The encoding method comprises:

Step S101: obtaining a first bit stream of an original encoded data, wherein the first bit stream comprises successive bits having a same value.

Specifically, the original encoded data could be data that to be transmitted from the transmitter (TX) to the receiver (RX). The original encoded data is in a form of bit stream. Each bit in the first bit stream could be a binary number "0" or "1." The term "value" represents the binary number of the bit.

Step S102: determining whether a number of the successive bits is greater than a predetermined number.

Step S103: if the number of the successive bits is greater than the predetermined number, then selecting at least one target bit from the successive bits.

Step S104: performing a logic NOT operation on the target bit to obtain a symbol bit.

Step S105: inserting the symbol bit to the successive bits to obtain an encoded bit stream.

In this embodiment, during the encoding process, the present disclosure makes a determination on the number of the successive bits having the same value, performing a logic NOT operation on at least one target bit according to the determination result to correspondingly obtain at least one symbol bit, and insert the at least one symbol bit into the successive bits of the first bit stream to get an encoded bit stream. This encoding method is simple, reduces the encoding complexity, and raises the encoding reliability and speed. In addition, because this encoding method has a simple logic, it can simplify the encoding hardware modules and thus reduces the costs of the hardware.

Conventionally, when the transmission data has 6 or more than 6 successive 0s or 1s, the error bit may occur during the transmission. Therefore, in an embodiment, the predetermined number is 4. Through the above mechanism, it could avoid an encoded bit stream having 6 or more than 6 successive 0s or 1s and thus raise the encoding reliability.

The predetermined number is not limited to the above-mentioned number 4. It could be adjusted according to the actual implementation.

Figure 2:
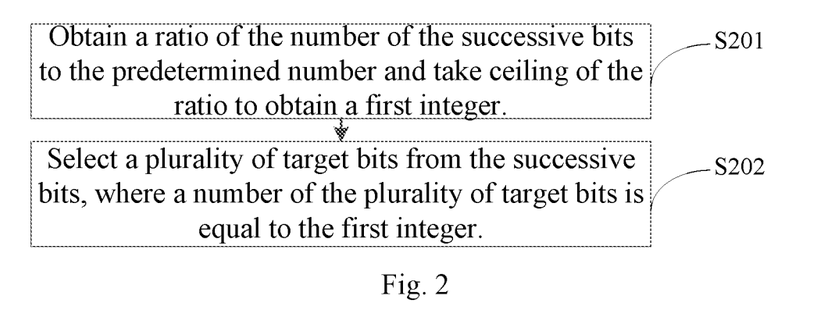
FIG. 2 is a flow chart of the step S102 according to a first embodiment of the present disclosure.

As show in FIG. 2, the step S103 comprises:

Step S201: obtaining a ratio of the number of the successive bits to the predetermined number and taking ceiling of the ratio to obtain a first integer.

Step S202: selecting a plurality of target bits from the successive bits, wherein a number of the plurality of target bits is equal to the first integer.

In addition, the step S104 comprises: performing the logic NOT operation on the plurality of target bits to obtain a plurality of symbol bits.

The step S103 comprises: inserting the plurality of symbol bits into the successive bits to obtain the encoded bit stream.

The meaning of "take ceiling" means that if the ratio is not an integer, the integer part of the ratio is added by 1 to obtain the first integer. Specifically, when the number of the successive bits is 6 and the predetermined number is 4, the ratio of the number of the successive bits to the predetermined number is 1.5 and thus the first integer is 2.

Figure 3:
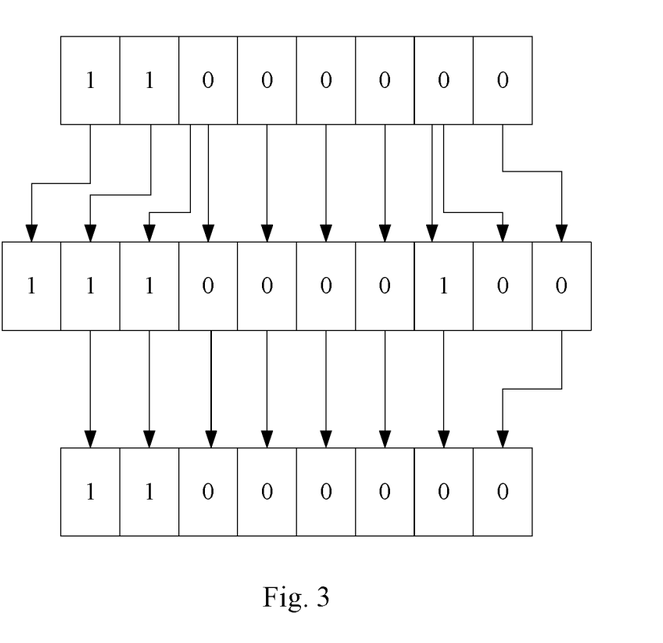
FIG. 3 is a diagram of an encoding/decoding process when the first bit stream is 8-bit data according to an embodiment of the present disclosure.

As shown in FIG. 3, in an embodiment, the first bit stream is 8-bit data. The first bit stream is "11000000," which has 6 successive 0s. This means that this first bit stream has 6 successive bits having the same value "0." The predetermined number is 5. Then, the first integer is 2. That is, the present disclosure selects two target bits from the successive 6 bits and the value of the target bits is "0." Then, the logic NOT operation is performed on the two target bits to respectively obtain two symbol bits. Here, the value of the symbol bits is "1." Furthermore, the two symbol bits are inserted into the successive bitts to obtain the encoded bit stream. In this embodiment, the encoded bit stream is "1110000100."

The data in the encoded bit stream could be other data as long as the encoded bit stream does not have successive 6 bits having the same number. For example, the encoded bit stream could be "1110001000," "1110010000," "1100100001," "1100001001," "1100100001," "1100100010," "1100100100," "1100101000," "1100010001," "1100010010," "1100010100," "1100001001" or "1100001010." That is, the number of bits between two adjacent symbol bits of the plurality of symbol bits is smaller than or equal to the predetermined number and the number of bits between two adjacent symbol bits of the plurality of symbol bits is greater than or equal to 1.

Figure 4:
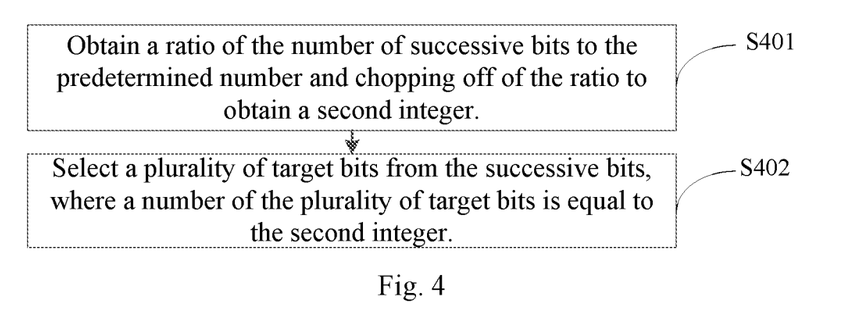
FIG. 4 is a flow chart of the step S102 according to a second embodiment of the present disclosure.

In another embodiment, as shown in FIG. 4, the step S103 comprises;

Step S401: obtaining a ratio of the number of successive bits to the predetermined number and chopping off of the ratio to obtain a second integer.

Step S402: selecting a plurality of target bits from the successive bits, wherein a number of the plurality of target bits is equal to the second integer.

The step S104 comprises: performing the logic NOT operation on the plurality of target bits to obtain a plurality of symbol bits.

The step S105 comprises: inserting the plurality of symbol bits into the successive bits to obtain the encoded bit stream.

The term "chop off" means chopping the decimal portion of the ratio when the ratio is not an integer to get the second integer. Specifically, when the number of the successive bits is 6 and the predetermined number is 4, the ratio of the number of the successive bits to the predetermined number is 1.5 and thus the second integer is 1.

Figure 5:
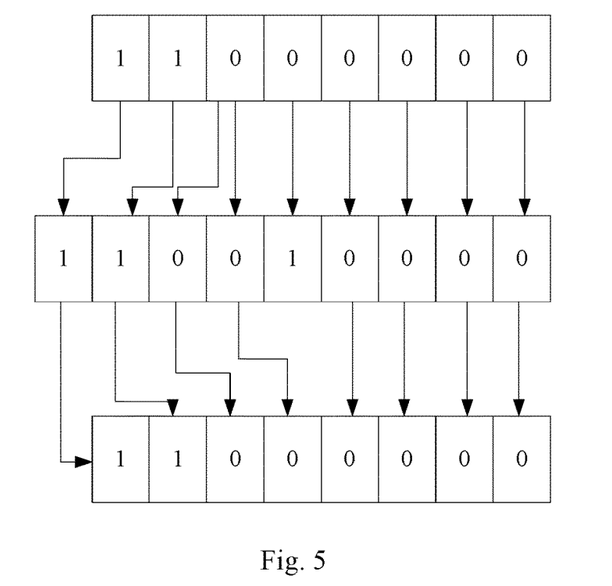
FIG. 5 is a diagram of an encoding/decoding process when the first bit stream is 8-bit data according to another embodiment of the present disclosure.

As shown in FIG. 5, in an embodiment, the first bit stream is 8-bit data. The first bit stream is "11000000," which has 6 successive 0s. This means that this first bit stream has 6 successive bits having the same value "0." The predetermined number is 5. Then, the second integer is 1. That is, the present disclosure selects one target bit from the successive 6 bits and the value of the target bit is "0." Then, the logic NOT operation is performed on the target bit to obtain one symbol bit. Here, the value of the symbol bits is "1." Furthermore, the symbol bit is inserted into the successive bitts to obtain the encoded bit stream. In this embodiment, the encoded bit stream is "110010000."

The data in the encoded bit stream could be other data as long as the encoded bit stream does not have successive 6 bits having the same number. For example, the encoded bit stream could be "110001000" or "110000100." From the above, it could be understood that the number of the successive 0s in the encoded bit stream is not greater than 5. This could raise the reliability of data transmission.

In other words, in this embodiment, the number of bits between two adjacent symbol bits of the plurality of symbol bits is smaller than or equal to the predetermined number and the number of bits between two adjacent symbol bits of the plurality of symbol bits is greater than or equal to 1.

When the first bit stream is 8-bit data, the encoded bit stream is 9-bit or 10-bit data.

Figure 6:
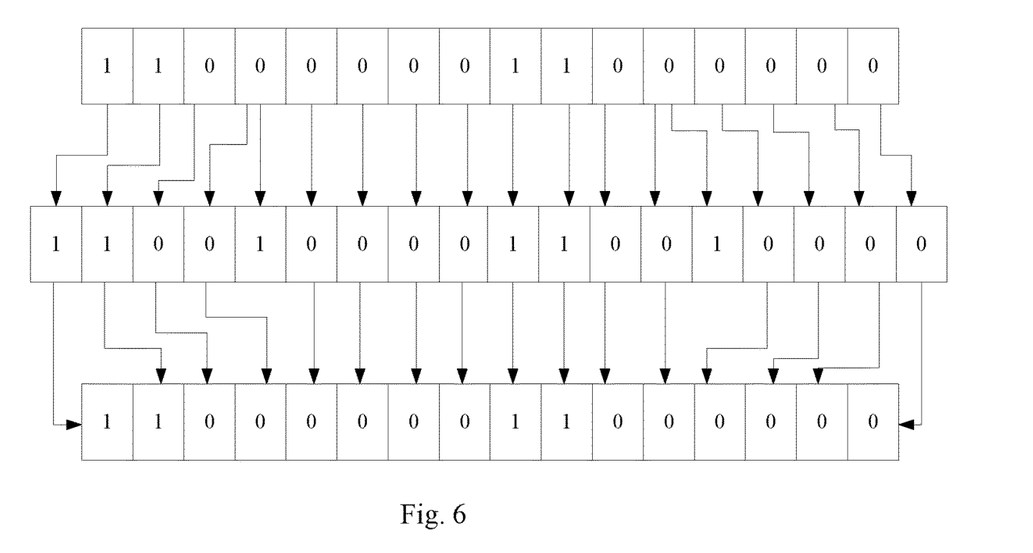
FIG. 6 is a diagram of an encoding/decoding process when the first bit stream is 16-bit data according to another embodiment of the present disclosure.

In some embodiments, as shown in FIG. 6, when the first bit stream is a 16-bit data, the first bit stream may comprise two segments of successive bits having the same value. Specifically, the first bit stream could be "1100000011000000." In this case, the two segments of successive bits are respectively encoded. The encoding method of each segment is the same as the encoding method of the 8-bit first bit stream in the previous embodiment. Therefore, the encoded bit stream becomes "110100000110100000." In an embodiment, as shown in FIG. 6, the encoded bit stream is "1110000010111000010."

As shown in FIG. 1, the encoding method further comprises:

Step S106: determining whether the encoded bit stream is serial data or parallel data.

Step S107: if the encoded bit stream is parallel data, then transforming the encoded bit stream from parallel data to serial data.

Through the above mechanism, the number of wires for the encoding process could be reduced and thus the cost could be reduced.

According to a second aspect of the present disclosure, a decoding method includes: obtaining an encoded bit stream to be decoded; identifying a symbol bit from the encoded bit stream; and deleting the symbol bit to obtain a decoded bit stream.

Figure 7:
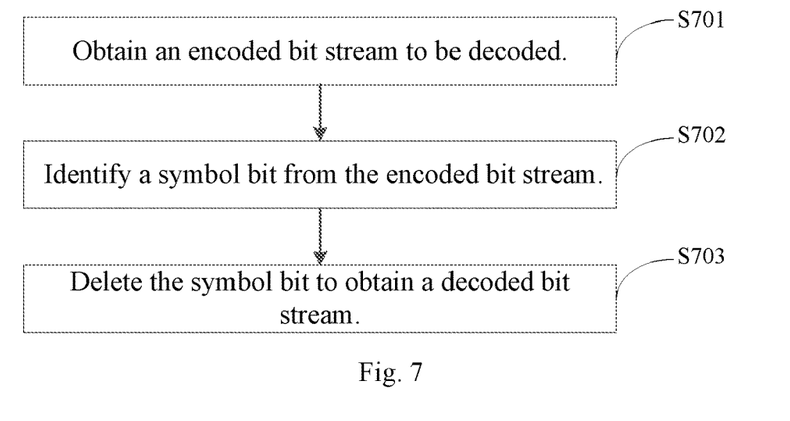
FIG. 7 is a flow chart of a decoding method according to an embodiment of the present invention.

Please refer to FIG. 7. FIG. 7 is a flow chart of a decoding method according to an embodiment of the present invention. The decoding method comprises:

Step S701: obtaining an encoded bit stream to be decoded.

The encoded bit stream to be decoded could be the data transmitted from the transmitter to the receiver. The original encoded data is in a form of bit stream. Each bit in the first bit stream could be a binary number "0" or "1." The term "value" represents the binary number of the bit.

Step S702: identifying a symbol bit from the encoded bit stream.

Step S703: deleting the symbol bit to obtain a decoded bit stream.

In this embodiment, during the decoding process, the present disclosure identifies the symbol bit from the encoded bit stream and deletes it such that the decoded bit stream could be obtained. The decoding method is simple and thus the design complexity is reduced and the decoding reliability is raised.

Figure 8:
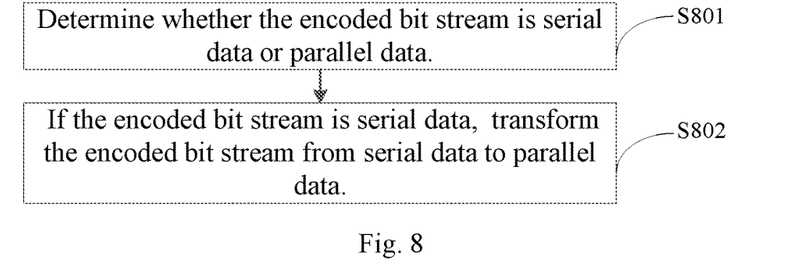
FIG. 8 is a flow chart depicting a data type transformation in the decoding method according to an embodiment of the present invention.

As shown in FIG. 8, before the step S702, the decoding method further comprises:

Step S801: determining whether the encoded bit stream is serial data or parallel data.

Step S802: if the encoded bit stream is serial data, then transforming the encoded bit stream from serial data to parallel data.

Through the above mechanism, the efficiency of data transmission could be further raised.

Figure 9:
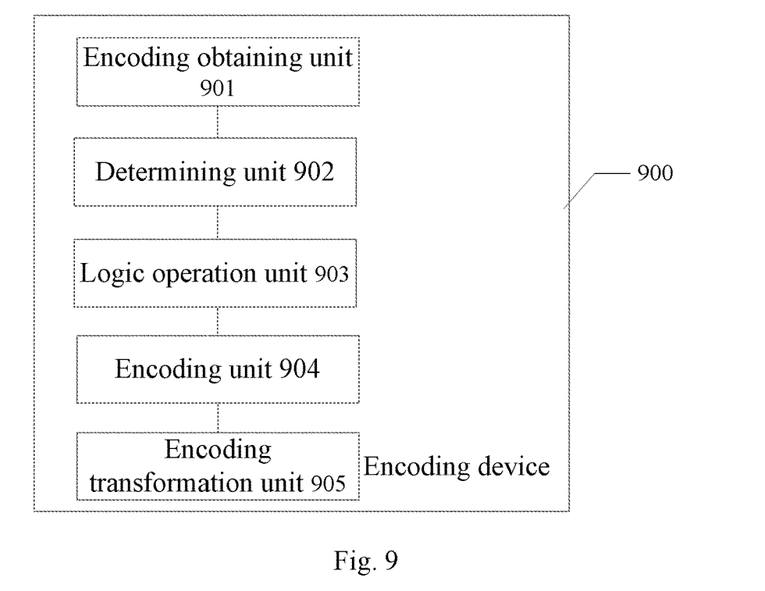
FIG. 9 is a diagram of an encoding device according to an embodiment of the present invention.

In addition, in order to implement the above-mentioned encoding method, an encoding device is disclosed according to an embodiment of the present disclosure. As shown in FIG. 9, the encoding device 900 comprises: an encoding obtaining unit 901, a determining unit 902, a logic operation unit 904 and an encoding unit 904.

The encoding obtaining unit 901 is configured to obtain a first bit stream of an original encoded data, wherein the first bit stream comprises successive bits having a same value.

The determining unit 902 is configured to determine whether a number of the successive bits is greater than a predetermined number and select at least one target bit from the successive bits if the number of the successive bits is greater than the predetermined number.

The logic operation unit 903 is configured to perform a logic NOT operation on the target bit to obtain a symbol bit.

The encoding unit 904 is configured to insert the symbol bit to the successive bits to obtain an encoded bit stream.

The determining unit 902 is further configured to determine whether the number of the successive bits is greater than the predetermined number, and obtain a ratio of the number of the successive bits to the predetermined number and take ceiling of the ratio to obtain a first integer if the number of the successive bits is greater than the predetermined number. In addition, the determining unit 902 is further configured to selecting a plurality of target bits from the successive bits, wherein a number of the plurality of target bits is equal to the first integer. The logic operation unit 903 is further configured to perform the logic NOT operation on the plurality of target bits to obtain a plurality of symbol bits. The decoding unit 904 is configured to insert the plurality of symbol bits into the successive bits to obtain the encoded bit stream.

The determining unit 902 is further configured to determine whether the number of the successive bits is greater than the predetermined number, and obtaining a ratio of the number of successive bits to the predetermined number and chopping off of the ratio to obtain a second integer if the number of the successive bits is greater than the predetermined number. In addition, the determining unit 902 is further configured to selecting a plurality of target bits from the successive bits, wherein a number of the plurality of target bits is equal to the second integer. The logic operation unit 903 is further configured to perform the logic NOT operation on the plurality of target bits to obtain a plurality of symbol bits. The decoding unit 904 is configured to insert the plurality of symbol bits into the successive bits to obtain the encoded bit stream.

The number of bits between two adjacent symbol bits of the plurality of symbol bits is smaller than or equal to the predetermined number and the number of bits between two adjacent symbol bits of the plurality of symbol bits is greater than or equal to 1.

As shown in FIG. 9, the encoding device 900 further comprises an encoding transformation unit 905, configured to determine whether the encoded bit stream is serial data or parallel data and transform the encoded bit stream from parallel data to serial data if the encoded bit stream is parallel data.

Accordingly, the decoding device of this embodiment could solve the error bit issue during the transmission process and thus raises the encoding reliability and eases the data transmission.

Figure 10:
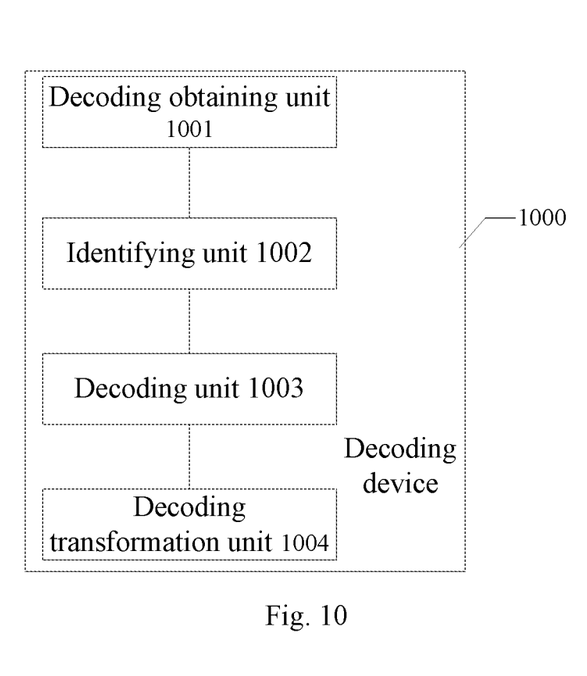
FIG. 10 is a diagram of a decoding device according to an embodiment of the present invention.

In addition, in order to implement the above-mentioned decoding method, a decoding device is disclosed according to an embodiment of the present disclosure. As shown in FIG. 10, the decoding device 1000 comprises: a decoding obtaining unit 1001, an identifying unit 1002, and a decoding unit 1003.

The encoding obtaining unit 1001 is configured to obtain an encoded bit stream to be decoded.

The identifying unit 1002 is configured to identify a symbol bit from the encoded bit stream.

The decoding unit 1003 is configured to delete the symbol bit to obtain a decoded bit stream.

As shown in FIG. 10, the decoding device 1000 further comprises a decoding transformation unit 1004, configured to determine whether the encoded bit stream is serial data or parallel data and transform the encoded bit stream from serial data to parallel data if the encoded bit stream is serial data.

During the decoding process, the decoding device merely needs to identify the symbol bit from the encoded bit stream and deletes it such that the decoded bit stream could be obtained. The decoding method is simple and thus the design complexity is reduced and the decoding reliability is raised.

According to an embodiment of the present disclosure, a computing device is disclosed. The computing device integrates any one of the encoding device or decoding device disclosed in the above embodiments. The computing device comprises one or more processors, a memory and one or more programs. The one or more programs are stored in the memory and are executed by the processor(s) to perform the steps of the aforementioned encoding method of any one of the above embodiments. Or, the one or more programs are executed by the processor(s) to perform the steps of the aforementioned decoding method of any one of the above embodiments.

Figure 11:
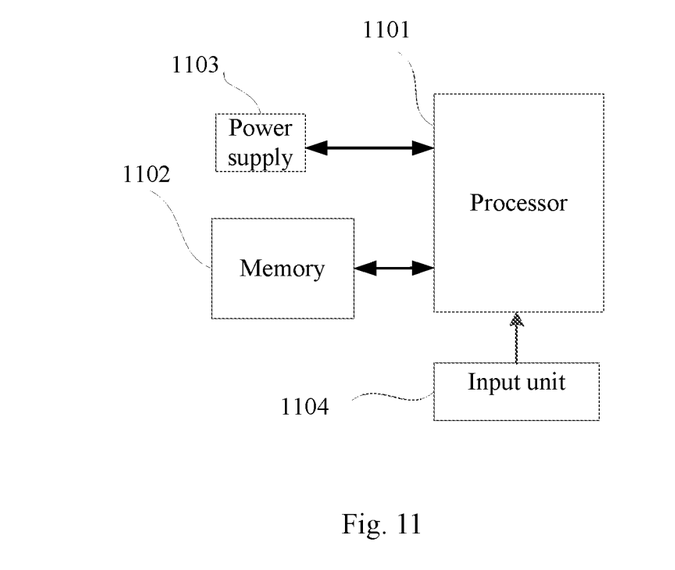
FIG. 11 is a diagram of a server according to an embodiment of the present invention.

According to an embodiment of the present disclosure, a computing device is disclosed. The computing device integrates any one of the encoding device or decoding device disclosed in the above embodiments. Please refer to FIG. 11. FIG. 11 is a diagram of a computing device according to an embodiment of the present invention.

The computing device could comprise a processor having one or more processing cores; a memory 1102 having one or more computer readable media; a power supply 1103 and an input unit 1104. A person having ordinary skills in the art could understand that the computing device shown in FIG. 11 is not a limitation of the present disclosure. The computer device could comprise less or more components or could comprise a combination of some components or different arrangements of the components.

The processor 1101 is the control center of the computing device, which is connected to other parts of the computing unit through interfaces and wires. The processor 1101 executes the software programs and/or modules stored in the memory 1102 and accesses the data stored in the memory 1102 to perform all kinds of functions and data processing of the computing device in order to monitor the entire computing device. Optionally, the processor 1101 could comprise one or more cores. Preferably, the processor 1101 could integrate an application processor and a modulation/demodulation processor. Here, the application processor is configured to handle the operation system and executes the user interface and applications. The modulation/demodulation processor is configured to handle wireless communications. It could be understood that the modulation/demodulation processor could also not be integrated in the processor 1101.

The memory 1102 could be used to store the software programs and modules. The processor 1101 executes the software programs and/or modules stored in the memory 1102 and accesses the data stored in the memory 1102 to perform all kinds of functions and data processing. The memory 1101 could mainly comprise a program storage section and a data storage section. Here, the program storage section could store the operation system and at least one application program of a function (such as audio playing function or image displaying function). The data storage section could store the data created according to the usage of the computing device. In addition, the memory 1202 could comprise a high speed random access memory (RAM) and/or a non-volatile memory (such as a hard disk, flash drive or any other non-volatile memories). Accordingly, the memory 1102 could further comprise a memory controller configured to provide the processor 1101 with the needed operations to access the memory 1102.

The computing device further comprises the power 1103 for providing power to all the components. Preferably, the power 1103 could be connected to the processor 1101 through the power management system such that the charging, discharging and power consumption management functions could be achieved by the power management system. The power 1103 could comprise one or more DC or AC powers, a rechargeable system, a power malfunction detection circuit, a power converter, an inverter, and a power condition indicator.

The computing device could further comprise an input unit 1104. The input unit 1104 is configured to receive inputted numeric or characteristic information and generate related keyboard, mouse, joystick, optical and/or trace ball inputs for user setting and function controls.

The computing device could further comprise a display unit and related illustration is omitted. The processor 1101 could load the executable document corresponding to one or more programs to the memory 1102 and executes the programs in the memory 1102 to perform the above-mentioned encoding/decoding methods.

A person having ordinary skill in the art could understand that all or part of the steps of the above-mentioned encoding/decoding methods could be accomplished through instructions or controlling hardware components according to the instructions. The instructions could be stored in a computer readable medium and loaded and executed by the processor.

According to an embodiment of the present invention, a computer readable medium is disclosed. The computer readable medium could be a read only memory, a random access memory, a hard disk and/or an optical disk. The computer readable medium stores the programs, which could be executed by the processor to perform one or more steps of the encoding/decoding methods in the above embodiments. For example, the instructions are loaded and executable by the processor to perform:

obtaining a first bit stream of an original encoded data, wherein the first bit stream comprises successive bits having a same value;

determining whether a number of the successive bits is greater than a predetermined number;

if the number of the successive bits is greater than the predetermined number, then selecting at least one target bit from the successive bits;

performing a logic NOT operation on the target bit to obtain a symbol bit; and inserting the symbol bit to the successive bits to obtain an encoded bit stream.

In another embodiment, the instructions are loaded and executable by the processor to perform:

obtaining an encoded bit stream to be decoded;

identifying a symbol bit from the encoded bit stream; and deleting the symbol bit to obtain a decoded bit stream.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. An encoding method, comprising:
obtaining a first bit stream of an original encoded data, wherein the first bit stream comprises successive bits having a same value;
determining whether a number of the successive bits is greater than a predetermined number;
if the number of the successive bits is greater than the predetermined number, then selecting at least one target bit from the successive bits;
performing a logic NOT operation on the target bit to obtain a symbol bit; and
inserting the symbol bit to the successive bits to obtain an encoded bit stream.

2. The encoding method of claim 1, wherein the step of obtaining the at least one target bit from the successive bits comprises:
obtaining a ratio of the number of the successive bits to the predetermined number and taking ceiling of the ratio to obtain a first integer; and
selecting a plurality of target bits from the successive bits, wherein a number of the plurality of target bits is equal to the first integer;
the step of performing the logic NOT operation on the target bit to obtain the symbol bit comprises:
performing the logic NOT operation on the plurality of target bits to obtain a plurality of symbol bits;
and the step of inserting the symbol bit to the successive bits to obtain the encoded bit stream comprises:
inserting the plurality of symbol bits into the successive bits to obtain the encoded bit stream.

3. The encoding method of claim 1, wherein the step of selecting the at least one target bit from the successive bits comprises:
obtaining a ratio of the number of successive bits to the predetermined number and chopping off of the ratio to obtain a second integer; and
selecting a plurality of target bits from the successive bits, wherein a number of the plurality of target bits is equal to the second integer;
the step of performing the logic NOT operation on the target bit to obtain the symbol bit comprises:
performing the logic NOT operation on the plurality of target bits to obtain a plurality of symbol bits;
and the step of inserting the symbol bit to the successive bits to obtain the encoded bit stream comprises:
inserting the plurality of symbol bits into the successive bits to obtain the encoded bit stream.

4. The encoding method of claim 2, wherein a number of bits between two adjacent symbol bits of the plurality of symbol bits is smaller than or equal to the predetermined number and the number of bits between two adjacent symbol bits of the plurality of symbol bits is greater than or equal to 1.

5. The encoding method of claim 4, wherein the first bit stream has 8 bits and the encoded bit stream has nine or ten bits.

6. The encoding method of claim 3, wherein a number of bits between two adjacent symbol bits of the plurality of symbol bits is smaller than or equal to the predetermined number and the number of bits between two adjacent symbol bits of the plurality of symbol bits is greater than or equal to 1.

7. The encoding method of claim 6, wherein the first bit stream has 8 bits and the encoded bit stream has nine or ten bits.

8. The encoding method of claim 1, further comprising:
determining whether the encoded bit stream is serial data or parallel data; and
if the encoded bit stream is parallel data, then transforming the encoded bit stream from parallel data to serial data.

9. A computer comprising:
one or more processors;
a memory; and
one or more application instructions, stored in the memory and executable by the one or more processors to perform operations comprising:
obtaining a first bit stream of an original encoded data, wherein the first bit stream comprises successive bits having a same value;
determining whether a number of the successive bits is greater than a predetermined number;
if the number of the successive bits is greater than the predetermined number, then selecting at least one target bit from the successive bits;
performing a logic NOT operation on the target bit to obtain a symbol bit; and
inserting the symbol bit to the successive bits to obtain an encoded bit stream.

10. The computer of claim 9, wherein the step of obtaining the at least one target bit from the successive bits comprises:
obtaining a ratio of the number of the successive bits to the predetermined number and taking ceiling of the ratio to obtain a first integer; and
selecting a plurality of target bits from the successive bits, wherein a number of the plurality of target bits is equal to the first integer;
the step of performing the logic NOT operation on the target bit to obtain the symbol bit comprises:
performing the logic NOT operation on the plurality of target bits to obtain a plurality of symbol bits;
and the step of inserting the symbol bit to the successive bits to obtain the encoded bit stream comprises:
inserting the plurality of symbol bits into the successive bits to obtain the encoded bit stream.

11. The computer of claim 9, wherein the step of selecting the at least one target bit from the successive bits comprises:

obtaining a ratio of the number of successive bits to the predetermined number and chopping off of the ratio to obtain a second integer; and selecting a plurality of target bits from the successive bits, wherein a number of the plurality of target bits is equal to the second integer;

the step of performing the logic NOT operation on the target bit to obtain the symbol bit comprises:

performing the logic NOT operation on the plurality of target bits to obtain a plurality of symbol bits;

and the step of inserting the symbol bit to the successive bits to obtain the encoded bit stream comprises:

inserting the plurality of symbol bits into the successive bits to obtain the encoded bit stream.

12. The encoding method of claim 10, wherein a number of bits between two adjacent symbol bits of the plurality of symbol bits is smaller than or equal to the predetermined number and the number of bits between two adjacent symbol bits of the plurality of symbol bits is greater than or equal to 1.

13. The encoding method of claim 12, wherein the first bit stream has 8 bits and the encoded bit stream has nine or ten bits.

14. The encoding method of claim 11, wherein a number of bits between two adjacent symbol bits of the plurality of symbol bits is smaller than or equal to the predetermined number and the number of bits between two adjacent symbol bits of the plurality of symbol bits is greater than or equal to 1.

15. The encoding method of claim 14, wherein the first bit stream has 8 bits and the encoded bit stream has nine or ten bits.

16. The computer of claim 9, further comprising:

determining whether the encoded bit stream is serial data or parallel data; and if the encoded bit stream is parallel data, then transforming the encoded bit stream from parallel data to serial data.

* * * * *